Dec. 31, 1957   W. H. SILVER ET AL   2,818,007
REVERSIBLE DISK PLOW

Filed April 6, 1954   3 Sheets-Sheet 3

INVENTORS.
WALTER H. SILVER
ROBERT E. COX
BY
ATTORNEYS

United States Patent Office 2,818,007
Patented Dec. 31, 1957

2,818,007

REVERSIBLE DISK PLOW

Walter H. Silver and Robert E. Cox, Moline, Ill., assignors to Deere & Company, Moline, Ill., a corporation of Illinois Application April 6, 1954, Serial No. 421,257

10 Claims. (Cl. 97—32)

The present invention relates generally to agricultural implements and more particularly to tractor-mounted reversible disk plows. More particularly, the present invention relates to reversible plows of the type that are adapted to be mounted on a tractor which thus forms a part of the supporting means for the implement.

The object and general nature of the present invention is the provision of a reversible or two-way plow having means providing, at the option of the operator, for either right-hand or left-hand plowing, and means insuring that in either plowing position the implement will be maintained in substantially a horizontal position relative to the ground irrespective of the tilting of the tractor that occurs, first in one direction and then in the other, due to the fact that at one time one of the rear wheels of the tractor runs in the previously formed furrow and, in the other plowing position, the other wheel of the tractor runs in the previously opened furrow.

A further feature of this invention is the provision of a dual land wheel structure particularly adapted for reversible or two-way plows and so constructed and arranged that in one plowing position one of the land wheels is in the proper position for holding the implement against displacement due to soil pressure, draft forces and the like, such wheel running on the unplowed land, while the other wheel, which runs on the unplowed land when the plow is reversed, is maintained in a position at least partially over the furrow formed by the furrow-opening means of the plow.

These and other objects and advantages of the present invention will be apparent to those skilled in the art after a consideration of the following detailed description, taken in conjunction with the accompanying drawings, in which.

Figure 1:
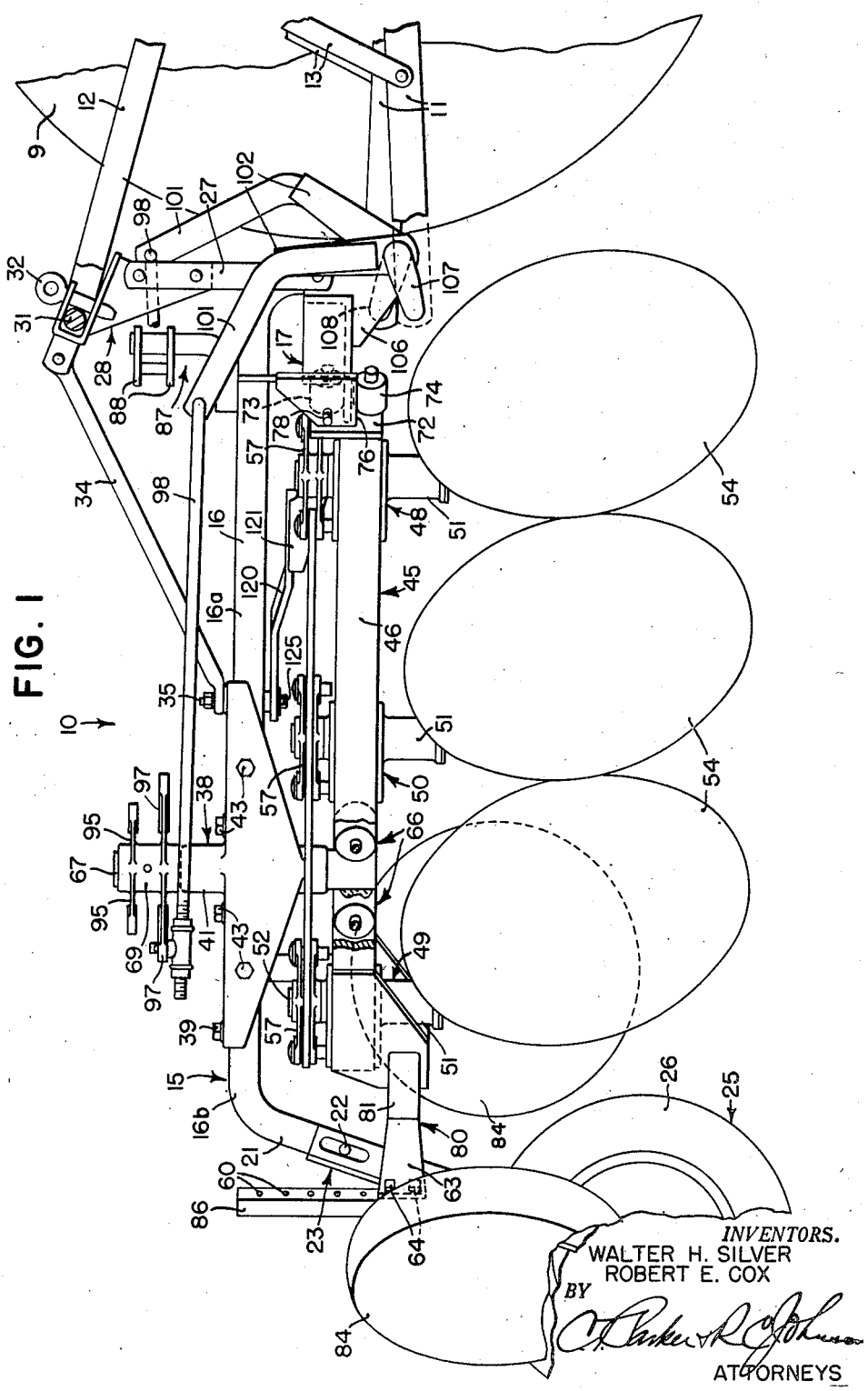
Fig. 1 is a side view of a reversible three-disk plow in which the principles of the present invention have been incorporated.

Referring first to Fig. 1, the implement in which the principles of the present invention have been incorporated is indicated in its entirety by the reference numeral 10 and the tractor to which the implement is particularly adapted to be connected, and by which the implement is supported out of contact with the ground for transport and the like, is represented by a pair of laterally spaced apart rear drive wheels 9, a pair of lower draft links 11 and an upper compression link 12, these links being adapted to be lowered and raised under the control of the operator through hydraulic means that forms a part of the tractor and which is connected with lower links through lift links 13. Tractors of this general type are conventional, so far as the present invention is concerned, and are well known in the art.

Figure 2:
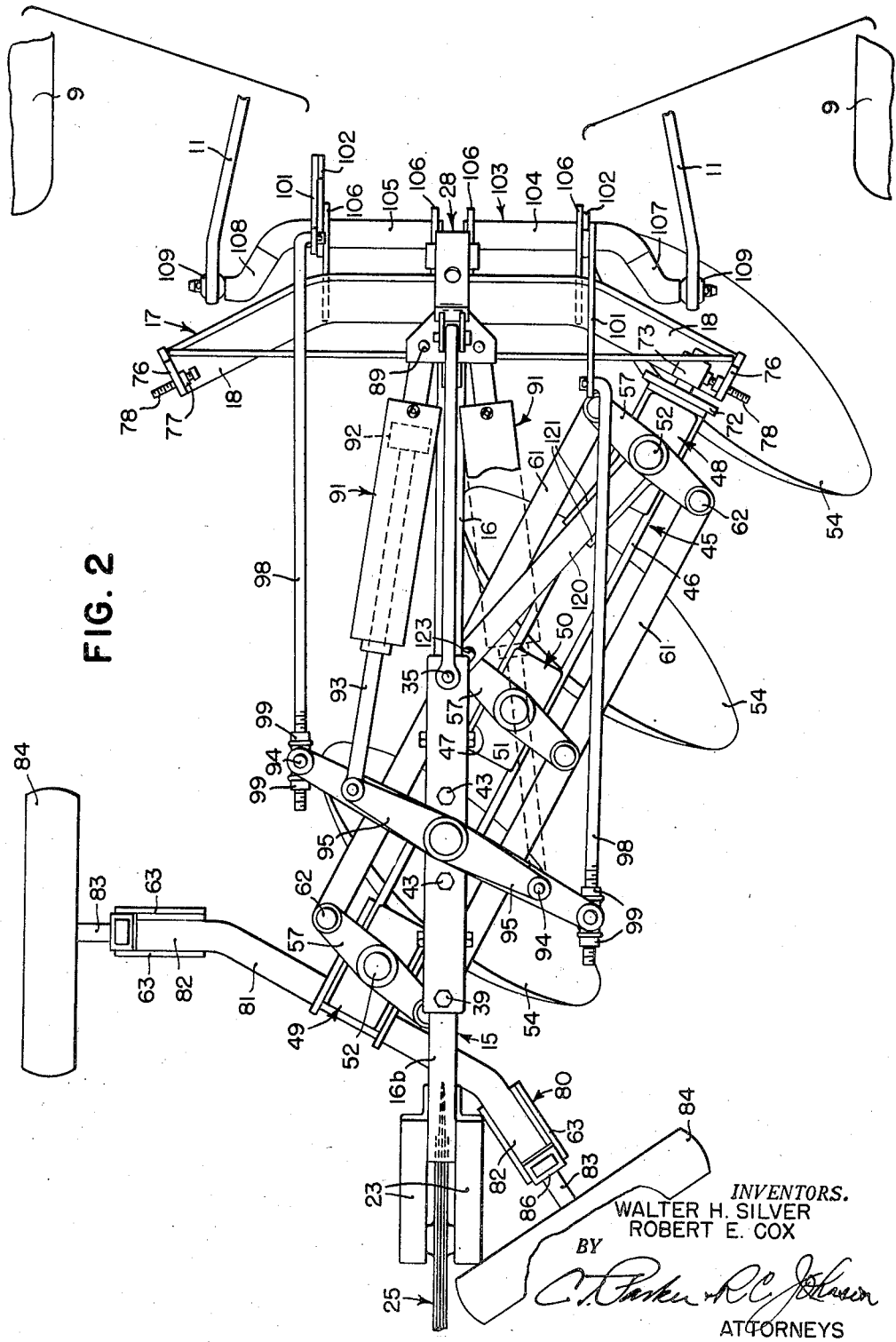
Fig. 2 is a plan view of the implement of Fig. 1, showing the furrow openers in a position for right-hand plowing.
Figure 3:
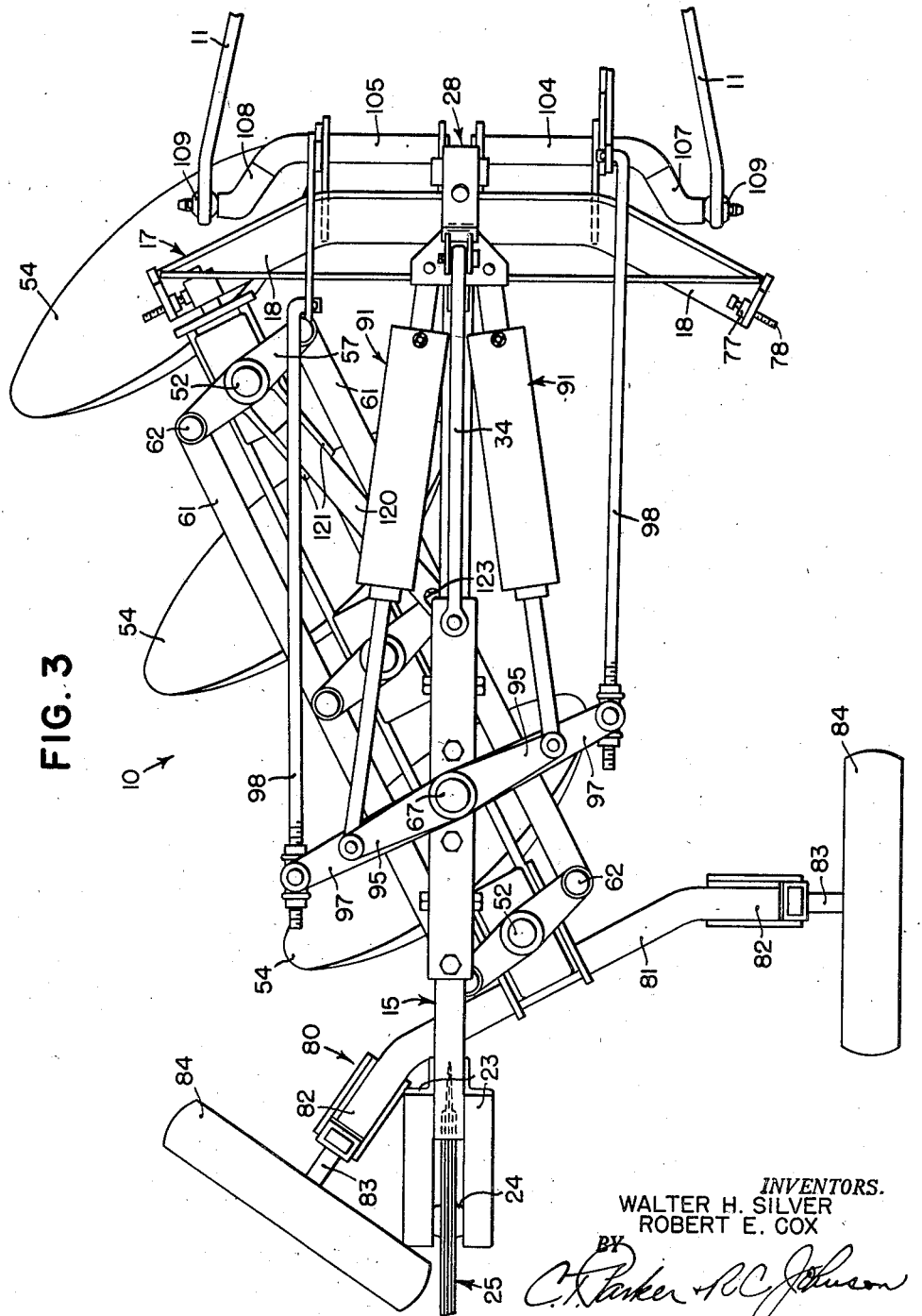
Fig. 3 is a view similar to Fig. 2, showing the furrow openers in a position for left-hand plowing.

The implement 10 is shown by way of illustration as a reversible three-disk plow and includes a main generally fore-and-aft extending frame member 15, preferably in the form of a square bar or the like, as indicated at 16. The front end of the bar is secured in any suitable way to a crossbar 17 which may take the form of an angle, as shown in Fig. 2, having end portions 18 that extend outwardly and rearwardly, with the lower flange of the angle 17 disposed in a generally horizontal plane. The rear end of the frame bar 16 is bent downwardly, as shown at 21, Fig. 1, and is apertured to receive bolts 22 or other fastening means by which a pair of angle bars 23 are adjustably secured to the bar 16. As shown in Figs. 2 and 3, these angle bars 23 are spaced apart and carry a suitable shaft or axle upon which the hub 24 of a disk or colter 25 is journaled. The colter 25 is formed as a disk-like member having a relatively deep vertical flange 26 so that, when the flange cuts into the soil, the disk 25 holds the plow to its work and prevents the rear end from being displaced laterally.

A vertically extending mast section in the form of a bar 27 is fixed at its lower end to the front portion of the frame bar 16, and the upper end of the mast 27 is formed with a link-receiving socket member 28 to which the rear end of the link means 12 may be connected, as by a crossbar 31 and a quick-detachable pin 32, or other suitable means. A brace member 34 extends downwardly and rearwardly from the upper portion of the socket member 28 to a bolt 35 that forms a part of the means fixing a pivot casting member 38 to the frame bar 16. A bolt 39 connects the rear portion of the casting 38 to the frame bar 16. The frame bar 16 includes a front section 16a and a rear section 16b, the adjacent inner ends of which are separated by a vertical sleeve section 41 formed in the casting 38. Other bolts 43 complete the attachment of the casting member 38 to the frame bar means 16.

Mounted for rocking movement on the casting member 38 is a plow frame 45 that is swingable about a generally vertical axis as defined by the sleeve section 41. The plow frame 45 comprises a pair of bars 46 and 47 connected at their ends to front and rear bearing blocks 48 and 49 and at their intermediate sections to a center bearing block 50. Each of the bearing blocks 48, 49 and 50 includes a vertical sleeve section 51 in which the spindle 52 of a disk support or standard is received. The lower portion of each of the standards 52 rotatably supports a plow disk 54, with the upper end of each end of the spindle section extending upwardly through the associated bearing block. A double-ended arm 57 is fixed to the upper end of each of the disk standard spindles 52, and the respective left- and right-hand ends of the arms 57 are interconnected by parallel links 61 and associated pivots 62, whereby the disks 54 are swung together about their vertical axes when the disk frame 45 is swung from one side to the other relative to the main frame 15. The plow frame 45 is connected for swinging movement about its support in the pivot casting 38 by means of a pivot block 66 bolted or secured in any suitable way to the frame bars 46 and 47 and including an upwardly extending spindle section 67 that is swingable or rockable within the sleeve section 41. A collar 69 is secured to the upper end of the spindle 67 and serves, first, as means for holding the pivot block 66 in position on the plow frame 15. The collar 69 also serves as arm-supporting means, as will be described below in detail. The front end of the plow frame 45 carries a member 72 to which upper and lower rollers 73 and 74 are connected. The rollers 73 and 74 are spaced apart a distance sufficient to receive the horizontal flange 18 of the front frame member 17, whereby stresses and strains imposed on the plow frame 45 are transmitted to the main frame 15 through the cross-bar 17. A plate 76 is welded to each end of the cross angle 17 and has a nut 77 welded thereto and screw threadedly receiving an adjusting member 78 that serves as a stop against which the upper roller 73 bears in either the right-hand position (Fig. 2) or the left-hand position (Fig. 3) of the plow frame 45.

The rear end of the laterally swingable plow frame 45 carries a land wheel structure 80 in the form of a transversely disposed axle member 81 having rearwardly and laterally outwardly bent end sections 82 carrying spindles 83 on each of which a land wheel 84 is journaled. Preferably, each of the land wheel spindles 83 includes a vertically extending section 86 apertured, as indicated at 60, and disposed between a pair of attaching plates 63 that are fixed, as by welding, to the bent end sections 82 of the land wheel axle 81. Bolts 64 rigidly secure each land wheel spindle to the associated rear axle in different positions of adjustment, depending upon the depth of operation desired.

The angle of the axle sections 82 is particularly important. As will best be seen from Figs. 2 and 3, in the right-hand plowing position (Fig. 2), the left-hand land wheel 84 is disposed in a vertical fore-and-aft extending plane, while in the other or left-hand plowing position (Fig. 3), the right-hand land wheel 84 is in a vertical fore-and-aft extending plane. The length of the axle 81 is such that the idle or inactive land wheel, although disposed in the same horizontal plane as the active land wheel, lies at least partially above the furrow formed by the rear disk, the lowest point of the idle wheel being substantially at ground level only at the plowed ground side of the furrow opened by the rearmost furrow opener. Thus, the idle land wheel is disposed in a clear and open or unobstructed space and does not gather trash and the like.

The plow frame 45 is swung from one side to the other at the option of the operator by means of a suitable connection with the hydraulic system of the tractor. To this end, a bracket 87 is fixed to the front end of the main frame bar 16 and includes a pair of horizontal, generally vertically spaced attaching plates 88 that are apertured, as at 89, Fig. 2, to receive the front ends of a pair of single-acting hydraulic jacks or rams 91. Each of the rams or jacks 91, includes a piston 92 and a piston rod 93 the latter end of each piston rod being connected, as at 94, to an arm 95 that forms a part of the collar 69 (Fig. 1). A second pair of arms 97, carried by the collar 69, pivotally receives the rear end of a pair of forwardly extending links 98, the connection being made by means providing for lengthwise adjustment, such as a pair of lock nuts 99 associated with threaded portions on the rear ends of the links 98. The forward ends of the links or rods 98 are connected to arms 101 fixedly secured, respectively, to brackets 102 that are, in turn, welded to the end portions of a split rockshaft structure 103 consisting of right- and left-hand axle sections 104 and 105. The sections 104 and 105 are supported for rocking movement by bearing brackets 106 that are fixed, as by welding, to the crossbar 17. The outer ends of the rock-shaft sections 104 and 105 are offset rearwardly, as will best be seen in Figs. 2 and 3, and these rearwardly offset sections 107 and 108 have reduced ends to receive the ball connectors 109 at the rear ends of the draft links 11. As will best be seen from Fig. 1, the connection-receiving portions 107 and 108 are also offset in a generally vertical direction to compensate for lateral tilting of the tractor when, in plowing position, it operates with one rear wheel running in a previously opened furrow while the other rear wheel of the tractor runs on the land.

The operation of the implement described above is substantially as follows.

Referring first to Fig. 2, it will be noted that the disks 58 and associated plow frame 45 are in the right-hand plowing position. In this position, the right rear wheel of the associated tractor runs in a previously opened furrow and therefore the tractor itself is tilted laterally to the right. To compensate for this, the parts are so constructed and arranged that the right end portion 107 of the split rockshaft 103 is in a lower position relative to the left end section 108, which is in a higher position. Therefore, although the tractor itself is tilted laterally to the right, the plow itself operates in a generally upright or level position. The amount of vertical offset of the right- and left-hand rockshaft sections 107 and 108 may be adjusted by changing the position of the lock nuts 99 along the associated link or rod 98. When it is desired to change from right-hand plowing to left-hand plowing, the implement is first raised into a transport position, as by causing the tractor power lift mechanism to exert a lifting force through the lifting links 13 against the lower tension links 11. Then when the plow is lifted, the hydraulic rams or jacks 91 may be actuated by energy derived from the tractor power system, through any suitable means, to swing the arms 95 from their right-hand plowing position (Fig. 2) into their left-hand plowing position (Fig. 3). This swinging of the arms 95 not only swings the plow frame 45 to the left-hand plowing position, but also it exerts a forwardly directed thrust on the right-hand link 98 and a rearwardly directed pull on the left-hand link 98, which changes the positions of the split rockshaft sections 107 and 108, whereby the leftward tilting of the tractor when operating with its left wheel in a previously opened furrow is accommodated. Also, the movement of the plow frame 45 from its position shown in Fig. 2 to the position shown in Fig. 3 changes the position of the land wheels 84, swinging one into an active position and the other into an inactive position, as explained above.

According to the principles of the present invention, means is also provided to individually swing the disks 54 about their generally vertical axes when changing from a right-hand plowing position to a left-hand plowing position. To this end, an arm 120 is fixed to the forwardmost disk or standard spindle 52, as by a pair of laterally spaced apart flanges 121 fixed to the associated pair of arms 57. The rear end of the arm 120 is slotted, as indicated at 123, Figs. 2 and 3, and the slotted end is received by a pin 125 (Fig. 1) that is carried by the main frame 16. If desired, the pin 125 may form an extension of the bolt 35. Thus, as will be seen from Figs. 2 and 3, when the plow frame 45 is swung from one position to another, the slotted end of the arm 120 remains connected with the main frame and therefore acts through the front arm 57, and the associated links 61 and rear pairs of arms 57, to swing the disks about vertical axes from a right-hand plowing position into a left-hand plowing position.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A reversible plow adapted to be connected with a tractor having laterally spaced apart rear drive means, an implement receiving connection including laterally spaced apart draft means connected to be raised and lowered together, and means for raising and lowering said spaced apart draft means, said reversible plow comprising frame means, plow means shiftably connected with said frame means and movable between right- and left-hand plowing positions, a pair of parts connected with said frame means in positions to connect with said spaced apart implement receiving draft means and each part being shiftable generally vertically relative to said frame means, means connected with said plow means to shift the latter from one position to another, and means connected with said plow shifting means and with said generally vertically shiftable parts for reversing the positions of the latter relative to said frame means when the plow means is reversed, whereby to keep the plow generally level relative to the ground surface while accommodating the location of one or the other of said tractor drive means in the adjacent previously formed furrow.

2. A reversible disk plow adapted to be mounted on a tractor having a generally vertically movable implement-lifting means, said plow comprising frame means, disk means shiftably mounted thereon so as to move between right- and left-hand plowing positions, a pair of laterally spaced apart members mounted on said frame means for generally vertical movement relative thereto and adapted to be connected with said implement-lifting means, means connected with said disk means to shift the latter from one position to another, and means connecting said shifting means to said laterally spaced apart members to alternately raise and lower said members relative to said plow frame means.

3. In a reversible plow, a generally fore-and-aft extending main frame, a plow frame carrying furrow opening means and swingable laterally about a generally vertical axis disposed between the ends of the main frame and also between the ends of the plow frame, the latter being shiftable relative to the main frame between right- and left-hand plowing positions, a rear axle member fixed at its mid-point in generally transverse relation to said plow frame and swingable laterally therewith, and a pair of land wheels journaled on the end portions of said rear axle, the end portions of said axle member extending divergingly rearwardly, whereby one wheel is spaced generally laterally in a landward direction from the furrow opening means while the other wheel is disposed generally rearwardly of the furrow opening means and over at least a portion of the furrow opened by said furrow opening means.

4. A reversible plow adapted to be connected with a tractor having laterally spaced apart rear drive means, an implement receiving connection including laterally spaced apart draft means connected to be raised and lowered together, and means for raising and lowering said spaced apart draft means, said reversible plow comprising frame means, plow means shiftably connected with said frame means and movable between right- and left-hand plowing positions, a split rockshaft structure including a pair of separately mounted, transversely aligned shaft sections, each of the latter having a rearwardly offset link-receiving section adapted to receive the spaced apart implement receiving draft means of the tractor, means connected with said plow means to shift the latter from one position to another, and means connected with said shaft sections for rocking the offset portion of one upwardly and the offset portion of the other shaft section downwardly, thus accommodating the location of one or the other of said tractor drive means in the adjacent previously formed furrow.

5. A reversible plow comprising a generally fore-and-aft extending frame member, a plow frame mounted for lateral swinging relative to the frame member about a generally vertical axis spaced rearwardly of the front end of said plow frame, arm means fixed to swing relative to said frame member with said plow frame, a bracket fixed to the forward portion of said frame member, plow frame swinging means connected between said bracket and said arms, and leveling means connected with said frame member and operatively connected with said arm means to be actuated thereby.

6. In a reversible plow, a generally fore-and-aft extending main frame member comprising bar means having a downwardly disposed rear portion, plow frame means pivoted for generally horizontal swinging in a generally lateral direction on the main frame member forward of said rear main frame portion, a stabilizing colter journaled for rotation in a generally vertical fore-and-aft extending plane on the lower part of said rear frame portion, a land wheel axle member fixed in generally transverse position to the rear portion of said plow frame means forward of said down turned frame portion and having laterally outer ends disposed in rearwardly divergent relation, land wheels journaled respectively on said ends, and means to swing said plow frame between right and left hand plowing positions in which one or the other of said land wheels is disposed relatively closely adjacent said colter while the other land wheel is disposed in a generally vertical fore-and-aft extending plane spaced landwardly of said plow frame means.

7. The invention set forth in claim 6, further characterized by said main frame member including a generally vertical sleeve section, said plow frame swinging means including a spindle extending upwardly through said sleeve section, arm means connected to the upper portion of said spindle, and a power exerting means anchored to the forward portion of said main frame member and connected with said arm means.

8. The invention set forth in claim 6, further characterized by hitch-receiving means connected with the forward portion of said main frame member and including oppositely movable generally vertically shiftable parts carried at the forward portion of said main frame member, and means connected between said plow frame swinging means and said parts for reversing the latter when said plow frame means is reversed.

9. A reversible plow adapted to be connected with a tractor having laterally spaced apart rear drive means, an implement receiving connection including laterally spaced apart draft means, said reversible plow comprising frame means, plow means shiftably connected with said frame means and movable between right- and left-hand plowing positions, a split rockshaft structure including a pair of separately mounted, transversely aligned shaft sections, each of the latter having a link-receiving section adapted to receive the spaced apart implement receiving draft means of the tractor, each link-receiving section being offset in a generally fore-and-aft direction, means connected with said plow means to shift the latter from one position to another, and means connected with said shaft sections for rocking the offset portion of one upwardly and the offset portion of the other shaft section downwardly, thus accommodating the location of one or the other of said tractor drive means in the adjacent previously formed furrow.

10. A reversible plow adapted to be connected with a tractor having laterally spaced apart rear drive means, an implement receiving connection including laterally spaced apart draft means, said reversible plow comprising frame means, plow means shiftably connected with said frame means and movable between right- and left-hand plowing positions, hitch-receiving means connected with the forward portion of said frame member and including oppositely movable generally vertically shiftable parts carried at the forward portion of said frame means, said hitch-receiving means being adapted to receive said draft means, means connected with said plow means to shift the latter from one position to another, and means connected with said oppositely movable parts for reversing the latter when said plow means is reversed, thus accommodating the location of one or the other of said tractor drive means in the adjacent previously formed furrow.

References Cited in the file of this patent
UNITED STATES PATENTS

| | | |
|---|---|---|
| 2,485,932 | Smith | Oct. 25, 1949 |
| 2,546,554 | McElroy | Mar. 22, 1951 |
| 2,582,478 | Carlson | Jan. 15, 1952 |
| 2,644,694 | Briscoe | July 7, 1953 |
| 2,648,267 | Pursche | Aug. 11, 1953 |
| 2,675,749 | Pursche | Apr. 20, 1954 |
| 2,698,563 | Edwards | Jan. 4, 1955 |
| 2,724,313 | Jennings | Nov. 22, 1955 |